(12) United States Patent
Peppel

(10) Patent No.: US 11,631,110 B2
(45) Date of Patent: Apr. 18, 2023

(54) AUDIENCE-BASED OPTIMIZATION OF COMMUNICATION MEDIA

(71) Applicant: Tyler Peppel, Sonoma, CA (US)

(72) Inventor: Tyler Peppel, Sonoma, CA (US)

(*) Notice: Subject to any disclaimer, the term of this patent is extended or adjusted under 35 U.S.C. 154(b) by 257 days.

(21) Appl. No.: 16/745,946

(22) Filed: Jan. 17, 2020

(65) Prior Publication Data

US 2020/0151773 A1  May 14, 2020

Related U.S. Application Data

(63) Continuation-in-part of application No. 16/368,010, filed on Mar. 28, 2019, now Pat. No. 10,540,694,
(Continued)

(51) Int. Cl.
*G06Q 30/00* (2012.01)
*G06Q 30/0251* (2023.01)
(Continued)

(52) U.S. Cl.
CPC ....... *G06Q 30/0271* (2013.01); *G06F 40/279* (2020.01); *G06F 40/40* (2020.01);
(Continued)

(58) Field of Classification Search
CPC .... G06Q 30/024–0273; G06F 40/0279; G06F 40/40; G06F 40/205; G06F 40/211;
(Continued)

(56) References Cited

U.S. PATENT DOCUMENTS 10,146,758 B1 * 12/2018 Dorner ................. G06F 40/169
10,146,770 B2 * 12/2018 Grant ..................... H04L 51/04
(Continued)

OTHER PUBLICATIONS

Dedrick, Rick, "A consumption Model for Targeted Electronic Advertising", IEEE, 1995. (Year: 1995), 1995.
(Continued)

*Primary Examiner* — Luis A Brown
(74) *Attorney, Agent, or Firm* — Perkins Coie LLP; Michael A. Glenn

(57) ABSTRACT

Introduced here are communication optimization platforms configured to improve comprehension, persuasion, or clarity of communications. Initially, a communication optimization platform can acquire input sample(s) that are associated with a source audience. The communication optimization platform can then create a linguistic profile for the source audience by examining the content of the input sample(s). Additionally or alternatively, the communication optimization platform may produce a psychographic profile that specifies various characteristics of the source audience, such as personality, opinions, attitudes, interests, etc. The communication optimization platform can then generate, based on the linguistic profile and/or the psychographic profile, affinity language for communicating with a target audience. By incorporating the affinity language into communications, the communication optimization platform can increase appeal to the target audience.

15 Claims, 10 Drawing Sheets

Related U.S. Application Data which is a continuation of application No. 16/022,300, filed on Jun. 28, 2018, now abandoned.

(60) Provisional application No. 62/526,866, filed on Jun. 29, 2017.

(51) Int. Cl.
  *G06F 40/279* (2020.01)
  *G06F 40/40* (2020.01)
  *G06V 30/148* (2022.01)
  *G06V 30/246* (2022.01)
  *G06F 40/211* (2020.01)
  *G06F 40/205* (2020.01)
  *G06F 40/56* (2020.01)
  *G06F 40/30* (2020.01)
  *G06F 40/253* (2020.01)
  *G06V 30/10* (2022.01)

(52) U.S. Cl.
  CPC .......... *G06V 30/153* (2022.01); *G06V 30/246* (2022.01); *G06F 40/205* (2020.01); *G06F 40/211* (2020.01); *G06F 40/253* (2020.01); *G06F 40/30* (2020.01); *G06F 40/56* (2020.01); *G06V 30/10* (2022.01)

(58) Field of Classification Search
  CPC ........ G06F 40/253; G06F 40/30; G06F 40/56; G06K 9/344; G06K 9/6842
  See application file for complete search history.

(56) References Cited

U.S. PATENT DOCUMENTS

| | | | | |
|---|---|---|---|---|
| 10,176,495 | B2* | 1/2019 | Hubbard | G06F 3/04847 |
| 10,282,409 | B2* | 5/2019 | Allen | H04L 67/306 |
| 10,346,930 | B1* | 7/2019 | Miller | G06Q 50/01 |
| 10,395,258 | B2* | 8/2019 | Akkiraju | G06Q 30/0251 |
| 10,769,223 | B1* | 9/2020 | Patel | G06Q 50/01 |
| 10,878,433 | B2* | 12/2020 | Jaidka | G06N 7/005 |
| 2004/0225553 | A1* | 11/2004 | Broady | G06Q 30/0202 |
| | | | | 705/7.33 |
| 2005/0043993 | A1* | 2/2005 | Stollman | G06Q 30/0224 |
| | | | | 705/14.67 |
| 2006/0041480 | A1* | 2/2006 | Briggs | G06Q 30/0243 |
| | | | | 705/14.48 |
| 2008/0004959 | A1* | 1/2008 | Tunguz-Zawislak | |
| | | | | G06Q 30/02 |
| | | | | 705/14.69 |
| 2008/0140524 | A1* | 6/2008 | Anand | G06Q 30/0271 |
| | | | | 705/14.66 |
| 2008/0154848 | A1* | 6/2008 | Haslam | G06F 16/382 |
| 2010/0004977 | A1* | 1/2010 | Marci | H04N 21/44218 |
| | | | | 705/7.32 |
| 2010/0042476 | A1* | 2/2010 | Gauri | G06Q 30/0601 |
| | | | | 705/7.29 |
| 2010/0088152 | A1* | 4/2010 | Bennett | G06Q 30/0601 |
| | | | | 705/26.1 |
| 2010/0211439 | A1* | 8/2010 | Marci | H04N 21/252 |
| | | | | 705/7.29 |
| 2011/0153414 | A1* | 6/2011 | Elvekrog | H04L 67/306 |
| | | | | 709/204 |
| 2011/0295678 | A1* | 12/2011 | Seldin | G06Q 30/02 |
| | | | | 705/14.42 |
| 2012/0166532 | A1* | 6/2012 | Juan | G06Q 30/0224 |
| | | | | 709/204 |
| 2013/0091063 | A1* | 4/2013 | Velten | G06Q 30/0207 |
| | | | | 705/80 |
| 2013/0226691 | A1* | 8/2013 | Chatow | G06Q 30/02 |
| | | | | 705/14.42 |
| 2013/0290091 | A1* | 10/2013 | Benyamin | G06Q 50/01 |
| | | | | 705/14.66 |
| 2013/0332308 | A1* | 12/2013 | Linden | G06Q 30/0631 |
| | | | | 705/26.7 |
| 2014/0129331 | A1* | 5/2014 | Spivack | G06Q 30/0255 |
| | | | | 705/14.53 |
| 2014/0200997 | A1* | 7/2014 | Anderson | G06Q 30/0229 |
| | | | | 705/14.53 |
| 2015/0142888 | A1* | 5/2015 | Browning | G06F 40/30 |
| | | | | 709/204 |
| 2015/0332665 | A1* | 11/2015 | Mishra | G10L 15/183 |
| | | | | 704/257 |
| 2015/0379571 | A1* | 12/2015 | Grbovic | G06Q 30/0256 |
| | | | | 705/14.54 |
| 2016/0012490 | A1* | 1/2016 | Brown | G06Q 50/01 |
| | | | | 705/14.58 |
| 2016/0071162 | A1 | 3/2016 | Ogawa et al. | |
| 2016/0086250 | A1* | 3/2016 | Gunjan | G06Q 30/0631 |
| | | | | 705/26.7 |
| 2016/0170956 | A1* | 6/2016 | Allen | H04L 67/01 |
| | | | | 704/9 |
| 2016/0170967 | A1* | 6/2016 | Allen | G10L 25/63 |
| | | | | 704/9 |
| 2016/0277579 | A1* | 9/2016 | Conway | G10L 15/1822 |
| 2017/0060982 | A1* | 3/2017 | Akkiraju | G06Q 30/02 |
| 2017/0061448 | A1* | 3/2017 | Akkiraju | G06Q 30/02 |
| 2017/0061497 | A1* | 3/2017 | Akkiraju | G06Q 30/0269 |
| 2017/0099339 | A1 | 4/2017 | Bastine | |
| 2017/0139916 | A1* | 5/2017 | Cama | G06F 16/9535 |
| 2017/0161794 | A1* | 6/2017 | Zhu | G06Q 30/0276 |
| 2017/0185964 | A1* | 6/2017 | Borges | G06Q 10/1053 |
| 2017/0228790 | A1* | 8/2017 | Smith | G06Q 30/0269 |
| 2017/0286853 | A1* | 10/2017 | Liensberger | H04W 4/02 |
| 2018/0113996 | A1* | 4/2018 | Cai | G06F 21/316 |
| 2018/0136794 | A1* | 5/2018 | Cassidy | G06Q 50/01 |
| 2018/0137432 | A1* | 5/2018 | Chen | G10L 25/63 |
| 2018/0159977 | A1* | 6/2018 | Danson | H04M 3/5232 |
| 2018/0189628 | A1* | 7/2018 | Kaufmann | G06F 40/56 |
| 2018/0203848 | A1* | 7/2018 | Perez | G10L 25/30 |
| 2018/0218333 | A1* | 8/2018 | Jenkins | H04L 67/535 |
| 2018/0255005 | A1* | 9/2018 | Agarwal | G06F 40/295 |
| 2018/0285746 | A1* | 10/2018 | Dunwoody | G06F 16/9535 |
| 2018/0365252 | A1* | 12/2018 | Bastide | G06F 16/972 |
| 2019/0220903 | A1* | 7/2019 | Peppel | G06Q 30/0271 |
| 2020/0279300 | A1* | 9/2020 | Kamma | G06Q 30/0281 |

OTHER PUBLICATIONS

Ravi, Sujith et al., "Automatic Generation of Bid Phrases for Online Advertising", New York City, WSDM, Feb. 4-6, 2010. (Year: 2010), Feb. 4, 2010.

\* cited by examiner

AUDIENCE-BASED OPTIMIZATION OF COMMUNICATION MEDIA

CROSS-REFERENCE TO RELATED APPLICATIONS

This application is a continuation-in-part of U.S. application Ser. No. 16/368,010, filed on Mar. 28, 2019, which is a continuation of U.S. application Ser. No. 16/022,300, filed on Jun. 28, 2018, which claims priority to U.S. Provisional Application No. 62/526,866, titled "Live, Audience-Based Optimization of Communication Media" and filed on Jun. 29, 2017, which is incorporated by reference herein in its entirety.

TECHNICAL FIELD

Various embodiments concern computer programs and associated computer-implemented techniques for optimizing communication media.

BACKGROUND

Delivering effective communications (e.g., advertisements) to individuals is becoming more difficult. For example, many users of social media platforms (e.g., Facebook® and Twitter®) are opting out of advertising entirely, and these users are skeptical of marketing content in general. Moreover, many users of web browsers have begun installing ad blocking extensions to prevent page elements, such as advertisements, from being displayed.

One option to improve receptiveness to advertisements is personalized marketing. Personalized marketing (also referred to as "one-to-one marketing") is a marketing tactic by which companies leverage data analytics to deliver individualized communications to prospective customers. Advancements in data analytics have enables marketers to deploy more effective customer engagement tactics.

Marketing optimization, meanwhile, is the process by which companies improve their marketing efforts in order to maximize desired business outcomes. Marketing optimization can be performed on individual marketing tactics (e.g., personalized marketing) employed by a company, as well as on the marketing strategy as a whole. However, marketing optimization is often difficult and imprecise due to the difficulty in understanding how a given individual is likely to react to content, particularly when attempting to craft a communication that is effective across large and diverse audiences.

SUMMARY

Introduced here are communication optimization platforms designed for optimizing communications based on the content of input samples (also referred to as "language samples"). By optimizing communications intended for distribution to a target audience, effectiveness of the communications can be improved.

Initially, a communication optimization platform can acquire one or more input samples that are associated with a source audience. Each input sample can include written language, spoken language, or any combination thereof. The communication optimization platform can then create a linguistic profile for the source audience by examining the content of the input sample(s). Additionally or alternatively, the communication optimization platform may produce a psychographic profile based on the input sample(s) that specifies various psychographic characteristics of the source audience.

The communication optimization platform can then generate, based on the linguistic profile and/or the psychographic profile, affinity language for communicating with a target audience. Thereafter, the communication optimization platform can cause the affinity language to be integrated into a communication, thereby increasing communication effectiveness to the target audience. The communication optimization platform may also examine the effect of these targeted communications. For example, the communication optimization platform may acquire one or more input samples that are associated with the target audience, and then examine the input sample(s) to discover what effect, if any, the targeted communications have had. In some embodiments, the communication optimization platform intelligently optimizes written communications over time by employing a continuous feedback loop. Thus, the communication optimization platform may consider live, audience-based feedback as input.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
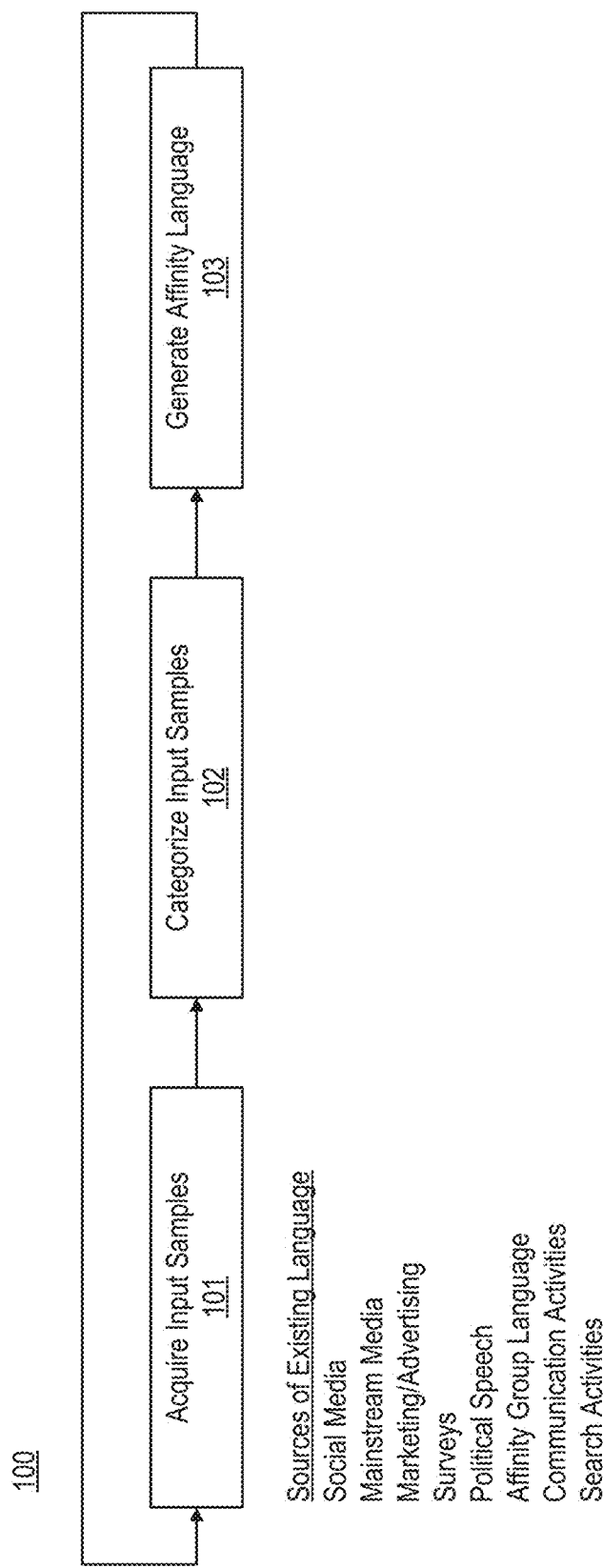
FIG. 1 depicts a flow diagram of a process for optimizing a written communication based on the content of input samples.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Personalized marketing is a marketing tactic by which companies leverage data analytics to deliver individualized product offerings to prospective customers. Personalized marketing is often dependent on a variety of different technologies for data collection, data classification, data analysis, data transfer, and data scalability. For example, these technologies may enable marketing professionals to collect first-party data, such as gender, age group, location, and income, and connect it with third-party data, such as click-through rates of advertisements.

Often, companies will optimize these processes to improve communications intended to elicit a desired result from a given audience. For example, advertisements may be optimized to increase the likelihood that a prospective customer completes a purchase of an advertised item. As another example, job postings may be optimized to increase the likelihood that a prospective employee having the proper skills opts to apply for an available position with an employer. However, in the case of communications designed to influence/inform, optimization of content can be imprecise due to the difficulty in understanding how a target audience is likely to react.

Introduced here, therefore, are computer programs and associated computer-implemented techniques for optimizing communication media based on the content of input samples. One example of communication media is a written communication, such as an advertisement for a good or service. By optimizing communication media intended for distribution to a target audience, effectiveness of the communication media can be improved.

Initially, a communication optimization platform can acquire one or more input samples that are associated with a source individual. Each input sample can include written language, spoken language, or any combination thereof. The communication optimization platform can then create a linguistic profile for the source individual by examining the content of the input sample(s). Additionally or alternatively, the communication optimization platform may produce a language-based psychographic profile that specifies various characteristics of the source individual, such as personality, opinions, attitudes, interests, etc.

The communication optimization platform can then generate, based on the linguistic profile and/or the psychographic profile, affinity language for communicating with a target individual. In some embodiments the source individual and the target individual are the same person, while in other embodiments the source individual and the target individual are different people that share a characteristic in common. For example, the source individual may be a prior purchaser of a particular item, and the target individual may a potential purchaser of the particular item. As another example, the source individual and the target individual may be of similar age, gender, socioeconomic status, geographical location, etc.

Thereafter, the communication optimization platform can cause the affinity language to be integrated into written communications, thereby increasing the appeal to the target individual. The communication optimization platform may also examine the effect of these personalized written communications. For example, the communication optimization platform can collect click-through rates to determine whether a greater proportion of advertisements are being converted into transactions. As another example, the communication optimization platform can collect post-message input samples to determine whether the content has changed. The communication optimization platform can make adjustments to the linguistic profile, psychographic profile, and/or affinity language based on these effects. In some embodiments, the communication optimization platform intelligently optimizes written communications over time by employing a continuous feedback loop. Thus, the communication optimization platform may consider live, audience-based feedback as input.

Embodiments may be described with reference to particular types of media content (e.g., written communications such as advertisements). However, those skilled in the art will recognize that the technology described herein is equally applicable to other forms of media content. For example, the communication optimization platform can be configured to examine/optimize any form of media content in a digital format.

Embodiments may also be described with reference to particular computer programs, system configurations, networks, etc. However, those skilled in the art will recognize that the technology is equally applicable to other computer program types, system configurations, network types, etc. For example, while the term "mobile application" may be used to describe a computer program, the relevant feature(s) may be embodied in another type of computer program.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to perform a process for examining input samples associated with a source audience, producing a linguistic profile and/or a psychographic profile for the source audience based on the input samples, generating affinity language based on the linguistic profile and/or the psychographic profile, etc. Moreover, machine learning algorithms and/or artificial intelligence algorithms may be employed to improve these processes over time.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are examples. Unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

The term "source audience" refers to the individual(s) from whom input samples are acquired. The term "target audience," meanwhile, refers to the individual(s) intended to be influenced by a written communication. A target audience may at least partially overlap with a corresponding source audience.

Descriptions for several other terms are included below:
- "Social media content" includes language derived from a social media platform, such as Facebook®, Twitter®, or Instagram®.
- "Mainstream media content" includes language derived from news programs (e.g., television programs or radio programs), news articles, commentary, opinion articles, blogs, etc.
- "Marketing media content" and "advertising media content" include commercial language of any kind.
- "Survey content" includes language derived from written responses to surveys, including preexisting surveys and newly developed surveys designed for the communication optimization platform introduced here.
- "Political media content" includes politically themed language (e.g., speeches, opinion articles, and commercials) of any kind.
- "Affinity group language" refers to the language written by member(s) of affinity groups, such as baseball fans, LEGO® customers, NBC® viewers, etc.
- "Batched inputs" refer to those input samples acquired by the communication optimization platform in the form of distinct batches.
- "Streamed inputs" refer to those input samples acquired by the communication optimization platform in the form of a continuous stream at a programmatic interface.

Technology Overview

FIG. 1 depicts a flow diagram of a process 100 for optimizing a written communication based on the content of input samples. As further described below, the process 100 can be implemented by a communication optimization platform that executes computer program(s) for performing operations on the input samples to generate output(s).

Initially, the communication optimization platform acquires input samples from at least one source (step 101). Each input sample can include written language, spoken language, or any combination thereof. Generally, each input sample is in a digital format (i.e., has a file structure that can be opened by a computing device). Examples of digital formats include word processor documents, spreadsheets, Portable Document Format (PDF) documents, Moving Picture Experts Group (MPEG) Layer-3 Audio (MP3), and MPEG Layer-4 Audio (MP4). In some embodiments, associated text accompanies at least some of the input samples 102. Examples of associated text include tags, commentary, and reviews.

In some embodiments the input samples are acquired from a single source, while in other embodiments the input samples are acquired from multiple sources. Examples of sources include social media, mainstream media, marketing media, political media, survey responses, affinity group language, etc. Input samples may also be derived from communication activities performed via phone, email, text message, etc. Further yet, input samples may be derived from browsing history, activities, etc. For example, the communication optimization platform may consider search queries previously submitted by a source audience as input samples.

Input samples may be acquired from online sources, offline sources, or any combination thereof. An example of an online source is a network-accessible database (also referred to as a "cloud database"). To access an online source, the communication optimization platform may interface with an application programming interface (API), bulk data interface, etc. Examples of offline sources include non-digital files (e.g., hardcopy documents or handwritten notes) that have been converted into a digital format.

As further described below, input samples may be part of a training set for machine learning. In such embodiments, the input sample(s) include terms that can be utilized in several different ways. For example, a communication optimization platform may use the training set to establish the strength/utility of alignment or an influencer relationship. Alignment is a measure of similarity with one or more target characteristics of a known set.

Input samples can be segregated into one or more categories for purposes of linguistic analysis (step 102), and then affinity language can be generated based on the categories (step 103). For example, input samples corresponding to multiple individuals may be examined to discover/produce affinity language suitable for all individuals. Said another way, if the input samples are associated with a source audience including multiple individuals, the communication optimization platform can identify affinity language that, if used in a written communication, will likely increase the receptiveness across a range of individuals in the source audience. As another example, input samples corresponding to a single individual may be examined to discover/produce a personalized affinity language suitable for that individual. Thus, characteristics of source audience language can be discovered by examining the input samples, regardless of whether how many individuals those input samples are associated with. Examples of characteristics include syntax, grammar, terminology, etc.

Those skilled in the art will recognize that an input sample could be associated with multiple categories. For example, an input sample received from a particular individual may be associated with a personal category corresponding to the particular individual and a group category (also referred to as a "cohort category" or "population category") corresponding to a group of which the particular individual is a part. In some embodiments each input sample is attributed to at least one category, while in other embodiments only those input samples satisfying certain criteria are attributed to a category. For example, if the communication optimization platform determines that an input sample is not relevant to any existing categories, then the communication optimization platform may discard the input sample. Alternatively, the communication optimization platform could create a new category for the input sample. In such embodiments, the communication optimization platform may not consider those categories having less than a predetermined number of input samples (e.g., one, five, or ten).

Figure 2:
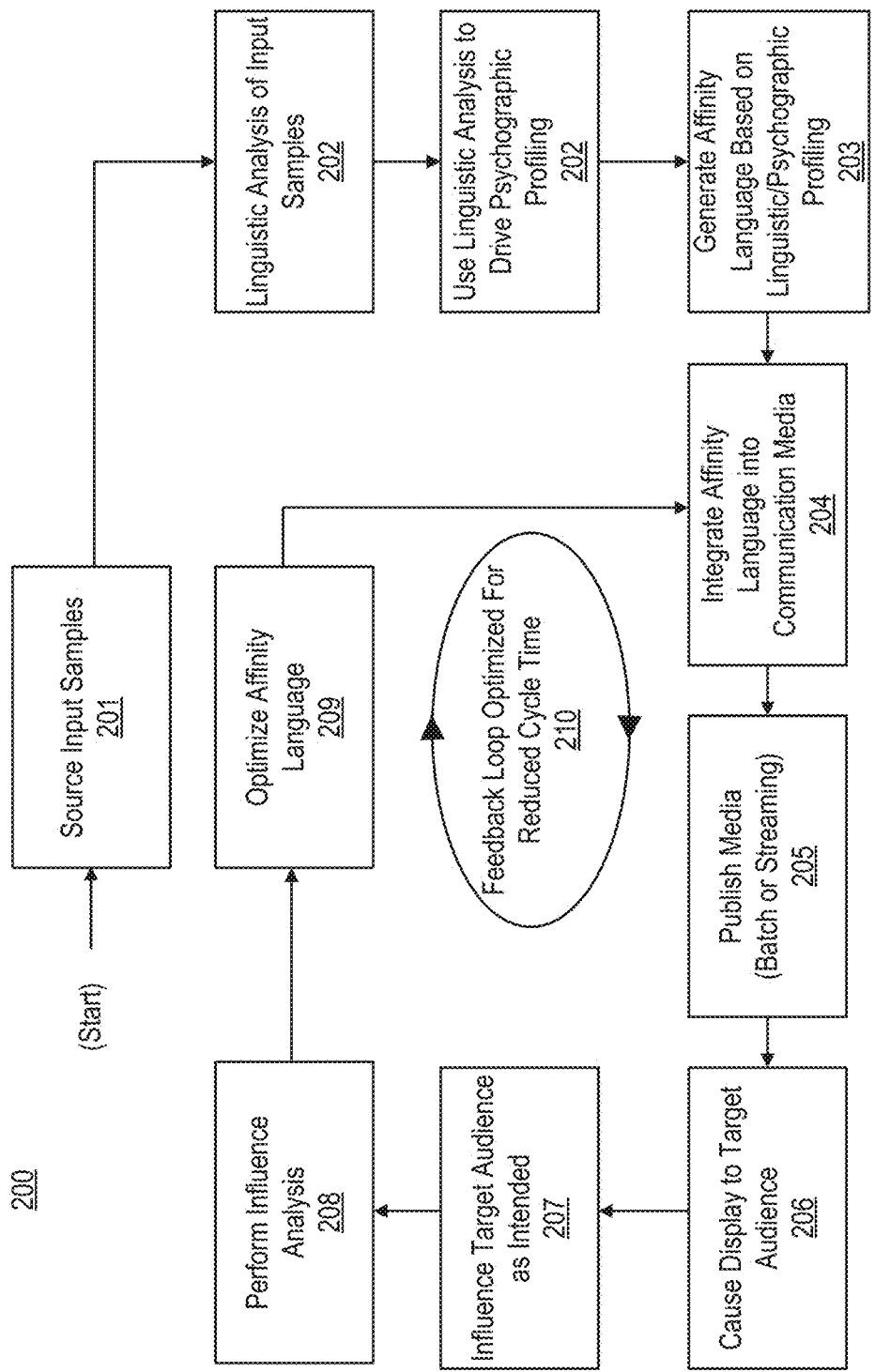
FIG. 2 depicts a process for optimizing communication media based on linguistic profiles and/or psychographic profiles generated based on input samples.

FIG. 2 depicts a process 200 for optimizing communication media based on linguistic profiles and/or psychographic profiles generated based on input samples. As further described below, a communication optimization platform can be designed to automate the process of sample language collection, analysis, optimization, and publishing, which can be followed by an automated feedback loop of resampling and further analysis to determine if the desired result has been achieved. In some embodiments, the process 200 is designed as an always-on feedback loop that runs continuously (e.g., in an online environment) to optimize the effectiveness of communication media.

Initially, the communication optimization platform identifies a source audience comprised of one or more individuals, and then acquires one or more input samples from the source audience (step 201). Generally, the individual(s) are related to a target audience for whom targeted communication media can be created. For example, the source audience may include current Lego® customers, and the target audience may include potential Lego® customers. Those skilled in the art will recognize that the source audience and the target audience need not necessary be fully inclusive. Said another way, the source audience may only include a subset of current Lego® customers (e.g., those corresponding to a particular geographical location, age, gender, etc.). Similarly, the target audience may only include a subset of potential Lego® customers.

The communication optimization platform can then perform linguistic analysis of the input sample(s) (step 202). Linguistic analysis may utilize various natural language processing (NLP) methods to profile the input sample(s) corresponding to the source audience, for example, by processing text media itself and context provided by associated metadata, tags, commentary, and reviews. These methods include any combination of machine learning, word usage analysis, word placement, lemmatization, morphological segmentation, sentence breaking, terminology extraction, etc. Each individual analysis may become part of a larger training set designed to increase the accuracy of linguistic analysis over time.

In some embodiments, the source audience is segmented by similarities in language usage as well as psychographic parameters. Thus, the communication optimization platform may use the linguistic analysis to drive psychographic profiling of the source audience (step 202). The communication optimization platform can then generate affinity language based on the linguistic analysis, psychographic analysis, or any combination thereof (step 203). Affinity language can be designed to optimize the effectiveness of communication media. For example, usage of affinity language within an advertisement may be intended to drive additional transactions involving the advertised item. Affinity language can include single words, phrases, and/or complex/lengthy passages.

The communication optimization platform can cause affinity language to be integrated into communication media to be presented to a target audience (step 204). In some embodiments the communication optimization platform itself integrated the affinity language into the communication media, while in other embodiments the communication optimization platform prompts another computer program (e.g., an advertising/marketing platform) to integrate the affinity language into the communication media. Integration of the affinity language can improve comprehension, persuasion, and clarity of the communication media.

The communication optimization platform may publish the communication media (step 205), and then cause display of the communication media to the target audience (step 206). For example, the communication optimization platform may cause/prompt dissemination of text-based communication media via a web browser, email message, etc. As another example, the communication optimization platform may cause/prompt dissemination of audio-based communication media via radio, television, etc. Thus, targeted communication media could be incorporated into written advertisements, podcasts, radio/television commercials, etc. Due to the presence of the affinity language, the communication media may influence the target audience into performing a desired action (step 207). For example, if the communication media includes an advertisement, then the desired action may be the purchase of the advertised item.

After the communication media has been displayed to the target audience, the communication optimization platform can perform influence analysis (step 208). For example, the communication optimization platform may collect input samples from the target audience, and then measure the disparity between these input samples and the input samples corresponding to the source audience. In such embodiments, the disparity may be indicative of the level of influence of the affinity language. The communication optimization platform may be configured to continuously optimize the affinity language by repeating these steps (e.g., steps 204-208) until a desired level of influence is reached.

In some embodiments, the communication optimization platform is configured to reduce the cycle time of the feedback loop corresponding to these steps (step 210). More specifically, the communication optimization platform may be configured to perform a continuous ongoing process of input sample collection, analysis, affinity language generation, publishing, resampling, and optimization within a framework designed for reducing the cycle time of the feedback loop. For example, responsive to a determination that the effect of a communication falls below a desired level, the communication optimization platform may be configured to update the communication by incorporating the affinity language into the communication in some other manner. Then, the communication optimization platform can cause the updated communication platform to be displayed to existing and new target audiences. In some embodiments each updated communication is shown to a different target audience, while in other embodiments each updated communication is shown to the same target audience, with the level of influence on each communication being measured through collection and analysis of language samples taken before and after the communication is shown. Thus, different versions of a communication corresponding to different incorporations of the affinity language can be shown to the same target audience over time.

To improve efficiency and consistency, some or all of these steps may be automated. For example, the communication optimization platform may automatically collect input samples, analyze the input samples, generate affinity language, and estimate influence level on behalf of an individual (e.g., a marketing professional). The individual may only be prompted to perform an action once a certain criterion is met (e.g., a specified level of influence is reached).

Figure 3:
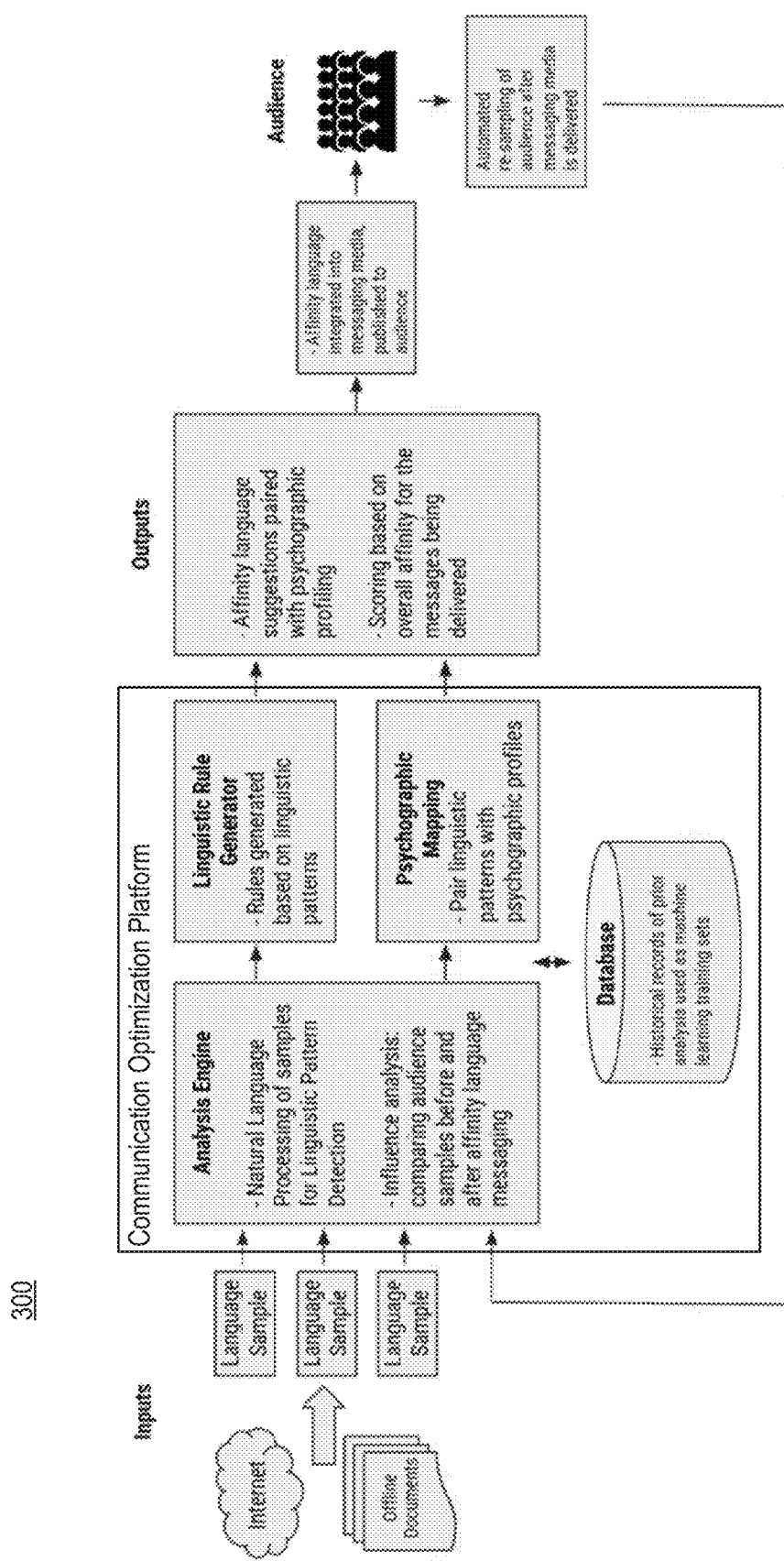
FIG. 3 depicts an example of a communication optimization platform configured to optimize the content of communication media for target audiences.

FIG. 3 depicts an example of a communication optimization platform configured to optimize the content of communication media for target audiences. Initially, the communication optimization platform can acquire one or more input samples that are associated with a source individual. Each input sample can include written language, spoken language, or any combination thereof. These input sample(s) can include digital files corresponding to electronic documents stored in network-accessible databases, physical documents (e.g., scanned copies of hardcopy documents), etc.

An analysis engine can process the input sample(s) before forwarding the input sample(s) to a linguistic rule generator (also referred to as a "linguistic modeling module") and/or a psychographic modeling module for further analysis. In some embodiments, the linguistic modeling module is configured to identify various linguistic features using Natural Language Processing techniques with an emphasis on pattern recognition. The Natural Language Processing techniques include, but are not limited to, optical character recognition (OCR), tokenization, word identification (also referred to as "morphological analysis"), sentence structure (also referred to as "syntactic analysis"), semantic interpretation (also referred to as "meaning"), and discourse processing (also referred to as "context"). Pattern recognition may be used to distinguish the linguistic feature(s) corresponding to each input sample, thereby resulting in a unique language "fingerprint" for each input sample.

The psychographic modeling module may be configured to map/correlate language patterns to various psychographic attributes. Examples of psychographic attributes include extraversion, emotional stability, agreeableness, conscientiousness, openness, etc. Mapping may be accomplished through the use of a rule set based initially on a large body of existing psychological studies on the identification of personality markers based on how an individual uses language. Results of these studies can be used to build a training set that may be used to develop and/or refine machine learning algorithms that map specific linguistic features to psychographic attributes such as those listed above.

Thus, the communication optimization platform may initially score language patterns against a reference sample baseline. Such action may result in one or more scoring metrics that may be used to generate affinity language. For example, the communication optimization platform may produce high scores for emotive expression (e.g., +120) and empathetic language (e.g., +86) and low scores for complex sentence structure (e.g., −22) and formal language structure (e.g., −47). The communication optimization platform may then apply rule(s) corresponding to the linguistic modeling module and/or the psychographic modeling module. One example rule is higher emotive expression scores in language correlate to the psychographic profile of empathetic. Thereafter, the communication optimization platform can generate an affinity profile based on the psychographic attributes derived from the linguistic analysis, and then use the affinity profile to generate affinity language for communicating with a target individual.

Affinity language can be used to enhance the effectiveness of communication with the target individual. The affinity language may be based on, for example, rules generated by the linguistic modeling module based on linguistic patterns in the input sample(s), psychographic features identified by the psychographic modeling module based on linguistic patterns in the input sample(s), etc.

Development of the communication optimization platform may include the creation of a machine-learning training set involving data labeling of language samples with psychographic attributes, such as open minded, conscientious, introverted, agreeable, empathetic, curious, cooperative, anxious, etc. The training set may be used to harvest relevant affinity language samples from different sources (e.g., the Internet) and generate new affinity language based on psychographic attributes such as those listed above. Examples of affinity language for the psychographic attribute of "empathetic" may include: "Your help is important to us . . . ," "The common good . . . ," "The community needs you . . . ," "Please consider the group . . . ," "The bigger picture . . . ," etc.

Thereafter, the communication optimization platform can cause the affinity language to be integrated into communication media, which is published on a media channel. Examples of media channels include websites, email messages, text messages, etc. By publishing the communication media, the communication optimization platform ensures that the communication media is shown to a target audience. The communication optimization platform may also examine the effect of these personalized written communications. For example, the communication optimization platform may collect input sample(s) from the target audience to see whether the communication media has influenced what these individual(s) are communicating about.

Figure 4:
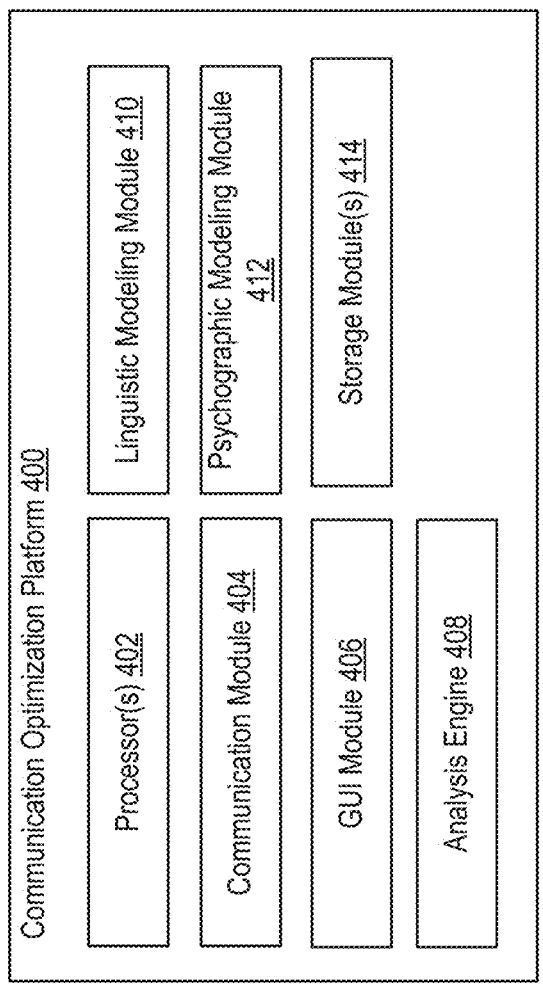
FIG. 4 is a high-level functional block diagram illustrating the architecture of a communication optimization platform configured to optimize the content of written communications.

FIG. 4 is a high-level functional block diagram illustrating the architecture of a communication optimization platform 400 configured to optimize the content of written communications. By optimizing the content of written communications intended for distribution to a target audience, effectiveness of these written communications can be improved. While embodiments may be described in the context of, for example, written communications such as advertisements, those skilled in the art will recognize that the technology may also be used for optimizing the content of other media (e.g., television programs and radio programs).

The communication optimization platform 400 can include one or more processors 402, a communication module 404, an analysis engine 406, a linguistic modeling module 408, a psychographic modeling module 410, a graphical user interface (GUI) module 412, and one or more storage modules 414.

The processor(s) 402 can execute instructions stored in the storage module(s) 414, which can be any device or mechanism capable of storing information. In some embodiments a single storage module includes multiple computer programs for performing different operations (e.g., parsing input samples, performing word recognition, categorizing input samples based on recognized words), while in other embodiments each computer program is hosted within a separate storage module.

The communication module 404 can manage communication between various components of the communication optimization platform 400. The communication module 404 can also manage communications between the computing device on which the communication optimization platform 400 resides and another computing device.

For example, the communication optimization platform 400 may reside on a mobile phone in the form of a mobile application. In such embodiments, the communication module 404 can facilitate communication with a network-accessible computer server responsible for supporting the mobile application. As another example, the communication optimization platform 400 may reside on a server system that includes one or more network-accessible computer servers. In such embodiments, the communication module 404 can communication with a computer program executing on a computing device associated with an individual under examination. Those skilled in the art will recognize that the components of the communication optimization platform 400 can be distributed between the server system and the computing device associated with the individual in various manners.

The GUI module 406 can generate the interface(s) through which an individual can interact with the communication optimization platform 400. For example, an interface may include a human-readable output that specifies a likelihood that a modified communication will influence a target audience. As another example, an interface may include a modified communication to be presented to a target audience. For instance, the individual may be permitted to examine modified communications before these modified communications are presented to the corresponding target audience(s).

The analysis engine 408 can perform one or more operations on input samples acquired by the communication optimization platform 400. As further described below, the input samples could be acquired from one or more sources. Examples of sources include network-accessible databases, computer programs (e.g., computer programs associated with social media, web browsing, messaging, calling, etc.), Internet cookies, etc. These sources may reside on the computing device on which the communication optimization platform 400 resides or some other computing device. Input samples will often be acquired by the communication optimization platform 400 from multiple sources. Thus, the analysis engine 408 may apply operation(s) on the input samples to ensure that input samples received from multiple sources are in a compatible format.

Each input sample will typically include digital media content indicative of written language, spoken language, or any combination thereof. Each input sample could correspond, for example, to a different text message, email message, phone call, social media post, browsing session, etc. Input samples could include text media, audio media, video media, or any combination thereof. For example, some input samples may only include text media, while other input samples may include audio media and video media. When an input sample includes audio media and/or video media, the analysis engine 408 may apply speech recognition algorithm(s) to generate a transcript of words spoken within the input sample.

The analysis engine 408 can process input samples into a format suitable for the other modules (e.g., the linguistic modeling module 410 and the psychographic modeling module 412). For example, the analysis engine 408 may perform image recognition or optical character recognition (OCR) operations on still images or video frames to identify data elements (e.g., logos, faces, places, or objects indicative of certain individuals, companies, or places) as well as a statistics operation to detect the frequency of certain data elements (e.g., phrases and/or terms).

The analysis engine 408 can also parse input samples to identify the individual responsible for generating each input sample. For example, the analysis engine 408 may identify the appropriate individual by parsing an input sample to discover a feature indicative of the appropriate individual (e.g., a characteristic conveyed by metadata or an identifier such as a phone number, email address, social media handle, etc.). Additionally or alternatively, the analysis engine 408 may discover an input sample is associated with a particular individual based on the source responsible for providing the input sample (e.g., a computer program that provides the input sample may be able to verify the particular individual is currently signed in).

The linguistic modeling module 410 can generate a linguistic model for a source audience corresponding to the input samples. More specifically, the linguistic modeling module 410 can examine the content of the input samples, and then produce a linguistic model representing linguistic features employed by the source audience. Examples of linguistic features include syntax, grammar, terminology, cadence, etc. Some linguistic features (e.g., cadence) will only be applicable if the input sample(s) include audio media and/or video media.

Additionally or alternatively, the psychographic modeling module 412 can generate a psychographic model for the source audience corresponding to the input samples. In addition to the linguistic features identified by the linguistic modeling module 410, the psychographic modeling module 412 may consider usage features (e.g., the duration or frequency of an activity resulting in an input sample), target features (e.g., the intended recipient of a message, call, or social media post), temporal features (e.g., the time of day during which an activity resulting in an input sample is performed), etc. Thus, the psychographic profile may specify various characteristics of the source audience, such as personality, opinions, attitudes, interests, etc.

The analysis engine 408 can use the linguistic models and/or the psychographic profiles to generate affinity language for communicating with a target audience. In some embodiments the source audience and the target audience include the same individual(s), while in other embodiments the source audience and the target audience include different individual(s) that share a characteristic in common. For example, the source audience may include prior purchaser(s) of a particular item, and the target audience may include potential purchaser(s) of the particular item. As another example, the source audience and the target audience may include individual(s) of a similar age, gender, socioeconomic status, educational level, geographical location, etc.

The analysis engine 408 can also cause the affinity language to be integrated into written communications, thereby increasing the appeal to the target audience. In some embodiments, the analysis engine 408 examines what effect, if any, these targeted written communications have had on the propensity of the target audience to complete a transaction. For example, the analysis engine 408 can collect click-through rates to determine whether a greater proportion of advertisements are being converted into transactions. As another example, the analysis engine 408 can collect post-message input samples to determine whether the content has changed (e.g., whether a given input sample refers to the targeted written communication). The analysis engine 408 may prompt the linguistic modeling module 410 to adjust the linguistic profile(s) based on these effects. Similarly, the analysis engine 408 may prompt the psychographic modeling module 412 to adjust the psychographic profile(s) based on these effects.

Figure 5:
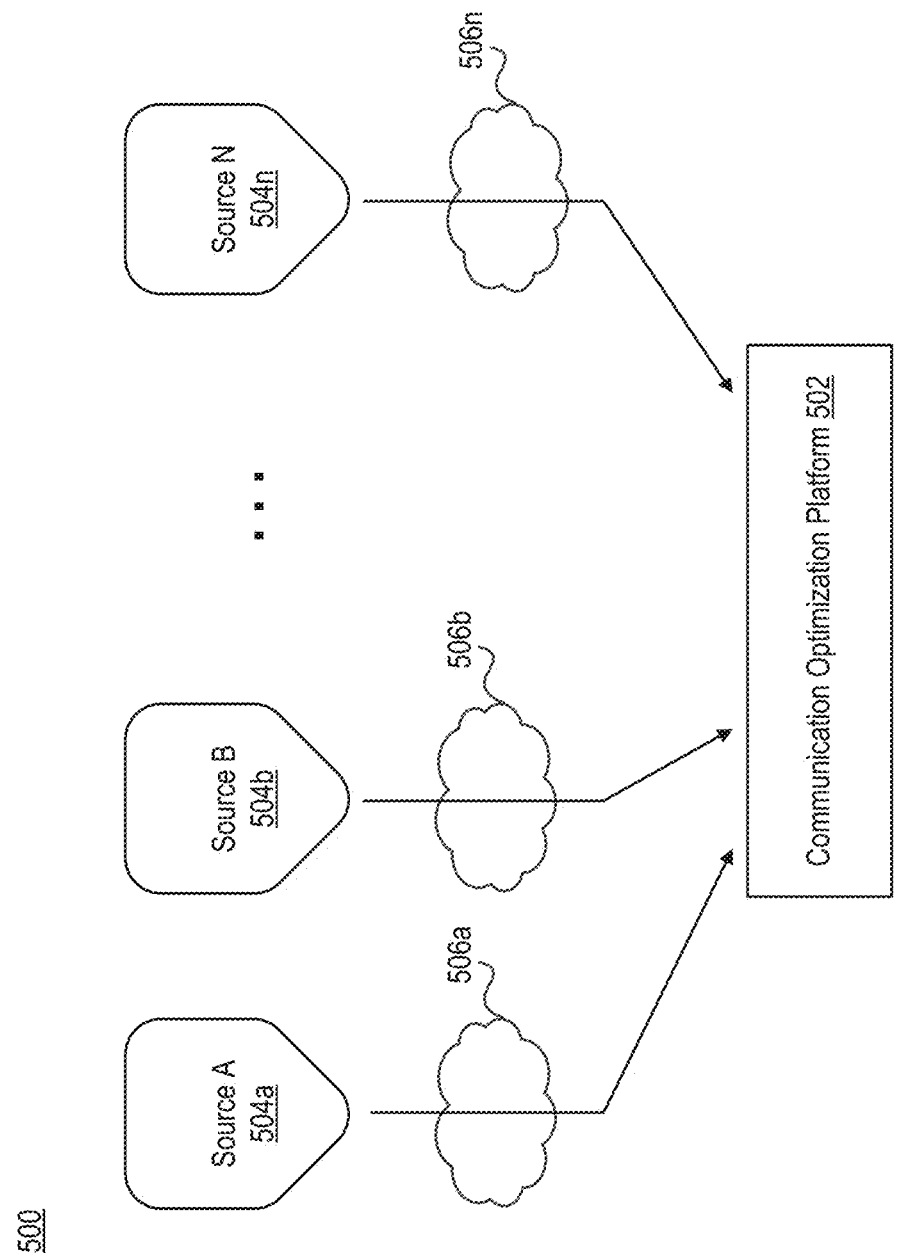
FIG. 5 depicts a network environment that includes a communication optimization platform configured to receive input samples from several different sources.

FIG. 5 depicts a network environment 500 that includes a communication optimization platform 502 configured to receive input samples from several different sources. Here, for example, the communication optimization platform 502 receives input samples from "n" number of sources (i.e., Source A 504a, Source B 504b, . . . , Source N 504n). Examples of sources include network-accessible databases, computer programs (e.g., computer programs associated with social media, web browsing, messaging, calling, etc.), Internet cookies, etc. For example, the communication optimization platform 502 may receive first input indicative of social media content from a first source, second input indicative of mainstream media content from a second source, third input indicative of communications produced by a source audience from a third source, etc.

The sources 504a-n can be connected to the communication optimization platform 502 via one or more networks 506a-n. The network(s) 506a-n can include personal area networks (PANs), local area networks (LANs), wide area networks (WANs), metropolitan area networks (MANs), cellular networks, the Internet, etc. Additionally or alternatively, the communication optimization platform 502 may communicate with each source over a short-range communication protocol, such as Bluetooth® or Near Field Communication (NFC). The communication optimization platform 502 may facilitate communication with these various sources through the use of application programming interfaces (APIs), bulk data interfaces, etc.

Each source can be configured to continuously or periodically transmit input samples to the communication optimization platform 502. In some embodiments, a given source continually uploads input samples to the communication optimization platform 502 so long as the source remains communicatively coupled to the computing device on which the communication optimization platform 502 resides (e.g., via a Bluetooth® communication channel). In other embodiments, a given source uploads input samples to the communication optimization platform 502 on a periodic basis (e.g., hourly, daily, or weekly).

Figure 6:
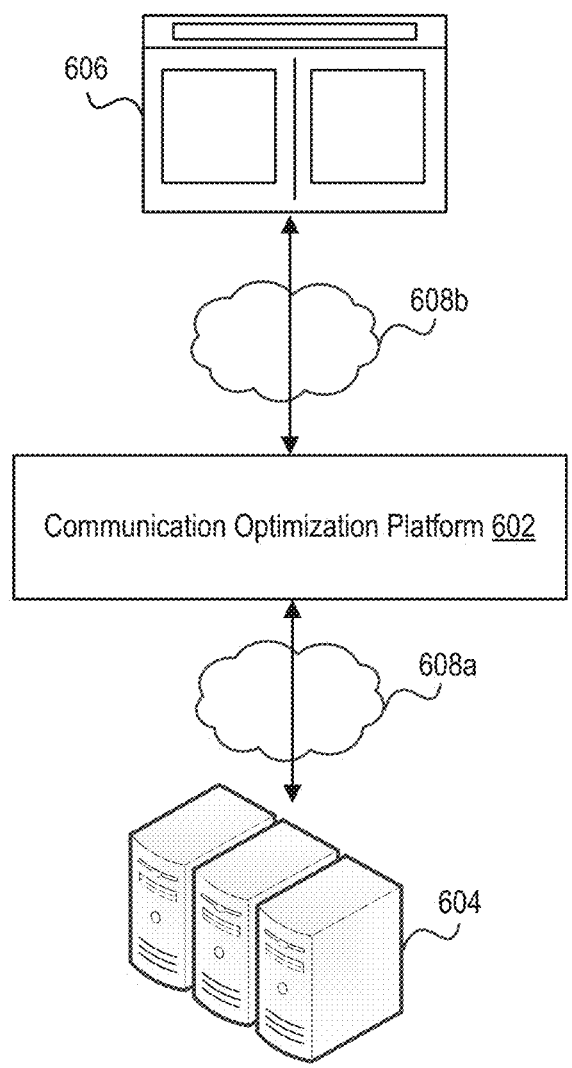
FIG. 6 illustrates a network environment that includes a communication optimization platform.

FIG. 6 illustrates a network environment 600 that includes a communication optimization platform 602. Individuals can interface with the communication optimization platform 602 via an interface 606. The communication optimization platform 602 may be responsible for examining input samples corresponding to a source audience, producing a linguistic profile based on the input samples, generating affinity language to be used in written communications, etc. The communication optimization platform 602 may also be responsible for creating interfaces through which an individual can view content (e.g., linguistic profiles, psychographic profiles, affinity language), review targeted written communications, manage preferences, etc.

The individual may be a prospective customer being targeted by a written communication or a marketing professional responsible for developing the written communication. Thus, some interfaces are configured to permit marketing professionals to examine, develop, and publish targeted written communications intended to elicit a desired result from a target audience (e.g., a purchase of an advertised item).

As noted above, the communication optimization platform 602 may reside in a network environment 600. Thus, the communication optimization platform 602 may be connected to one or more networks 608a-b. The network(s) 608a-b can include PANs, LANs, WANs, MANs, cellular networks, the Internet, etc.

The interface 606 is preferably accessible via a web browser, desktop application, mobile application, or over-the-top (OTT) application. Accordingly, the interface 104 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the communication optimization platform 602 are hosted locally. That is, the communication optimization platform 602 may reside on the computing device used to access the interface 606. For example, the communication optimization platform 602 may be embodied as a mobile application executing on a mobile phone or a desktop application executing on a personal computer. Other embodiments of the communication optimization platform 602 are executed by a cloud computing service operated by Amazon Web Services® (AWS), Google Cloud Platform™, Microsoft Azure®, or a similar technology. In such embodiments, the communication optimization platform 602 may reside on a host computer server that is communicatively coupled to one or more content computer servers 604. The content computer server(s) 604 can include input samples, linguistic profiles, psychographic profiles, affinity language, targeted written communications (e.g., personalized advertisements), non-targeted written communications (e.g., advertisement templates), etc. Such information could also be stored on the host computer server.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., input samples, linguistic models, affinity language) to be downloaded at a single point in time or on a periodic basis (e.g., weekly, daily, or hourly).

Figure 7:
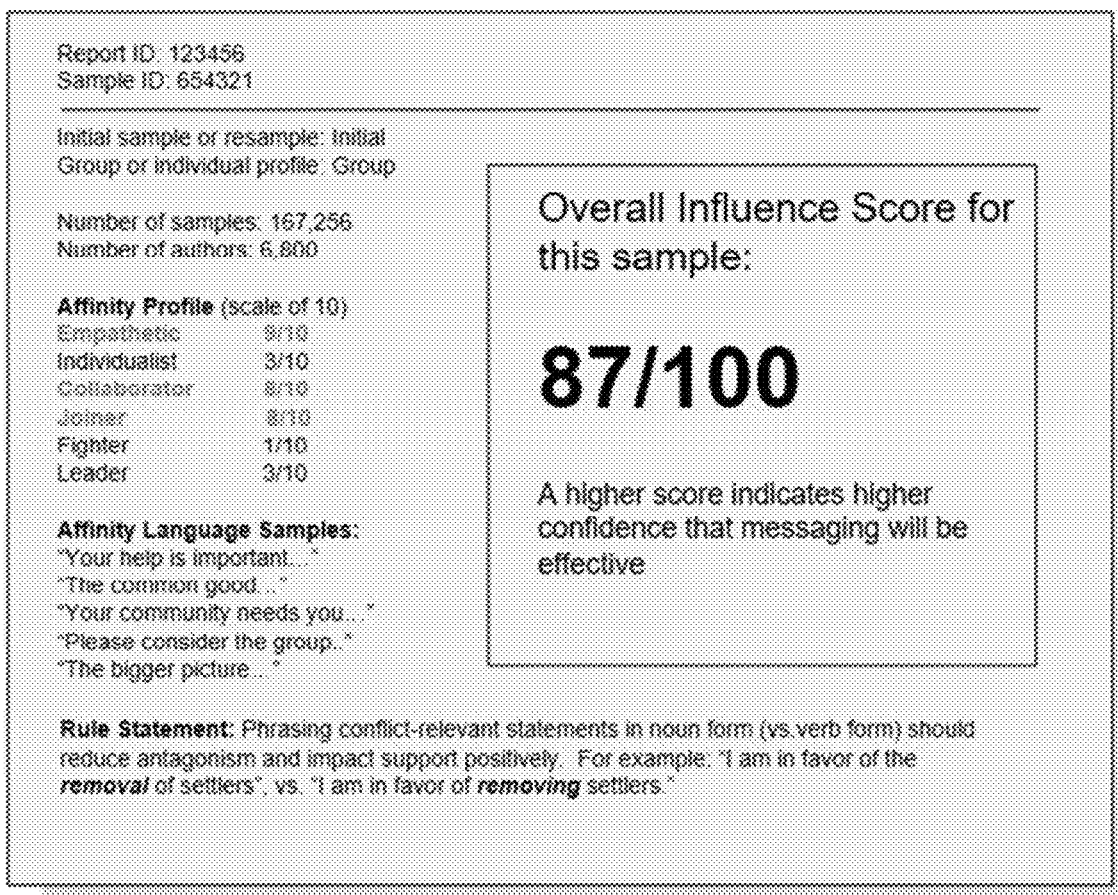
FIG. 7 depicts an example of a simulation report that specifies the expected influence of a given output.

In some embodiments, the communication optimization platform is configured to estimate how much a targeted written communication will influence a target audience. The communication optimization platform may estimate an influence level based on, for example, how much similar targeted written communications have influenced similar target audiences. FIG. 7 depicts an example of a simulated report that specifies the expected influence of a given output. Information included in the simulation report can be made available in a human-readable format or a machine-readable format.

After an initial analysis of affinity language, the communication optimization platform can generate an influence score. Higher influence scores generally indicate a higher probability of influencing the target audience. The underlying driver of a high influence score may be the similarity between the source and target audiences in terms of linguistic and psychographic scoring, which indicates whether these individual(s) are linguistically and psychographically well aligned. Significant alignment increases the probability of successfully influencing the target audience.

Some embodiments of the simulation report include a variety of other types of information as well. Here, for example, the simulation report specifies the number of input samples, the number of individuals in the source audience, the estimated impact on different types of target audiences, examples of affinity language, etc. Such information may be useful to a marketing professional responsible for determining which affinity language to use, whether the affinity language should be used, etc.

Figure 8:
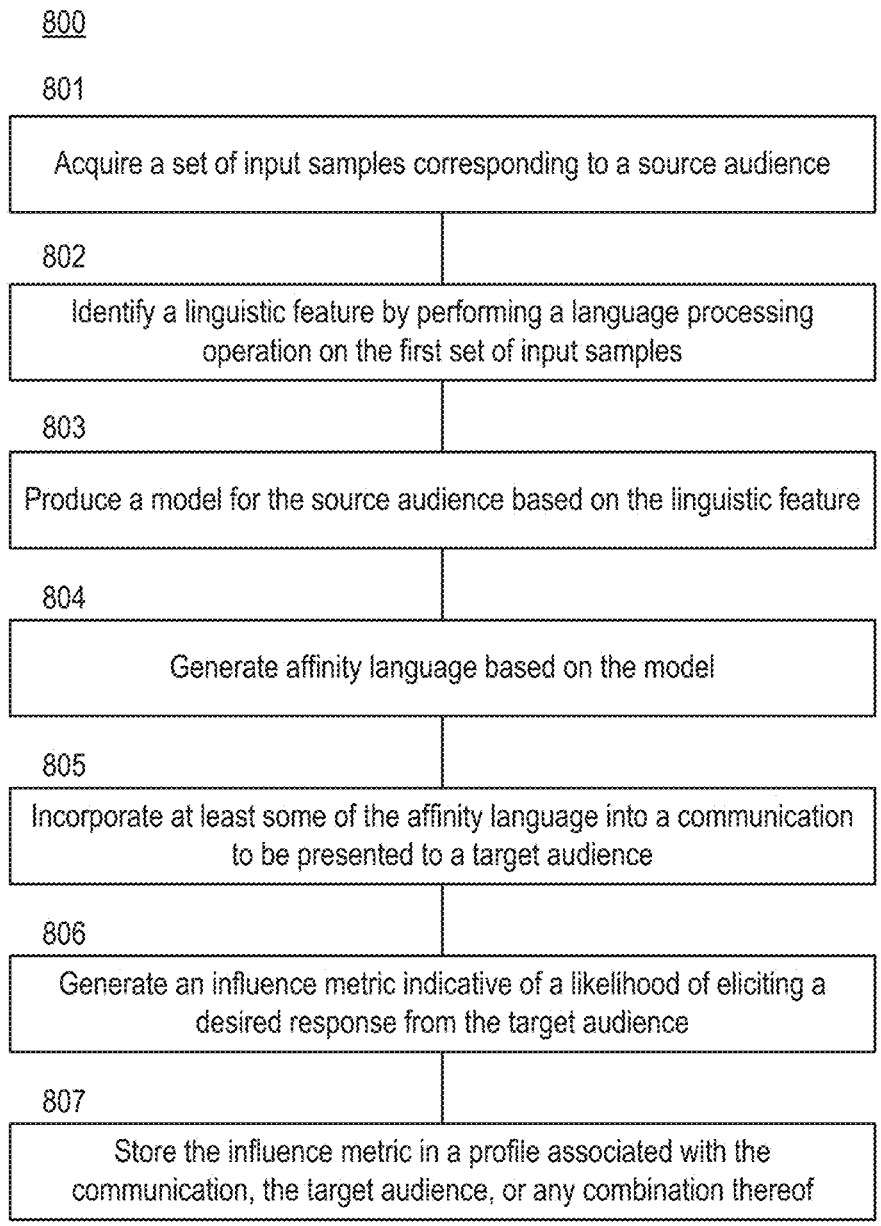
FIG. 8 is a flow diagram of a process for producing an influence metric indicative of the likelihood of eliciting a desired response from a target audience by presenting a communication that includes affinity language.

FIG. 8 is a flow diagram of a process 800 for producing an influence metric indicative of the likelihood of eliciting a desired response from a target audience by presenting a communication that includes affinity language. In some embodiments, the influence metrics are simply representative of the expected influence that a communication will have on the behavior of the target audience. In other embodiments, the influence metrics account for how the expected influence varies by geography, age, presentation medium, etc. While the process 800 is discussed in the context of influence metrics representative of estimated effectiveness, the same process 800 could be executed using impact metrics representative of the actual effectiveness (e.g., as measured based on an analysis of input samples associated with the target audience).

As discussed above, a communication optimization platform can initially acquire a set of input samples corresponding to a source audience (step 801). Each input sample can include written language and/or spoken language. For example, the input samples may include posts written on a social media platform by members of the source audience, recordings of survey calls to members of the source audience, etc.

The communication optimization platform can then create a linguistic profile for the source audience by examining the set of input samples. For example, the communication optimization platform may identify a linguistic feature for the source audience by performing a language processing operation on the set of input samples (step 802). Examples of linguistic features include syntax, grammar, terminology, cadence, etc.

The communication optimization platform can produce at least one model for the source audience based on the linguistic feature (step 803). For example, the communication optimization platform may produce a linguistic profile that specifies linguistic characteristic(s) of the source audience. Additionally or alternatively, the communication optimization platform may produce a psychographic profile that specifies psychographic characteristic(s) of the source audience.

The communication optimization platform can then generate, based on the model(s), affinity language for communicating with a target audience (step 804). Thereafter, the communication optimization platform can cause at least some of the affinity language to be incorporated into a communication to be presented to the target audience (step 805). Affinity language is incorporated into the communication in order to increase the effectiveness of communicating with the target audience. In some embodiments, the communication optimization platform generates the communication itself. In other embodiments, another entity generates the communication based on affinity language that has been made available by the communication optimization platform. For example, an entity (e.g., an enterprise that sells products to be advertised) may provide the first set of input samples to the communication optimization platform and then receive the affinity language from the communication optimization platform.

The communication optimization platform may estimate the effect that these targeted communications will have. Thus, the communication optimization platform may perform influence analysis to generate an influence metric indicative of a likelihood of eliciting a desired response from the target audience (step 806). For example, the communication optimization platform may produce an influence metric indicative of the likelihood that members of the target audience will purchase a product advertised in the communication. As another example, the communication optimization platform may produce an influence metric indicative of the likelihood that members of the target audience will align with a political theme or a social theme that is the subject of the communication.

In some embodiments, the influence metric is stored in a profile that is associated with the communication, the target audience, or any combination thereof (step 807). The profile may include a series of influence metrics generated over time. Accordingly, the communication optimization platform could analyze the profile to detect patterns in the estimated effectiveness of the communication as determined based on the series of influence metrics. For example, if the communication optimization platform determines that recent influence metrics correspond to a negative pattern indicative of a downward trend in estimated effectiveness, the communication optimization platform may opt to alter the communication, retire the communication (e.g., in favor of a new communication with different affinity language), etc.

In some embodiments, the profile further includes multiple influence thresholds. In such embodiments, the communication optimization platform may track how each influence metric compares to the multiple influence thresholds to detect patterns in the series of influence metrics and then associate each pattern with an influence rate indicative of the estimated effect the communication will have on the target audience. For example, upon generating an influence metric for a communication, the communication optimization platform may compare the influence metric to a threshold. Upon determining that the influence metric does not exceed the threshold, the communication optimization platform may update the communication by incorporating the same affinity language into the communication in another manner or incorporating different affinity language into the communication. These steps may be repeated until the influence metric exceeds the threshold. For example, these steps may be automatically performed/facilitated by a machine learning algorithm in order to continually improve the effectiveness of the communication without explicit instructions to do so.

Figure 9:
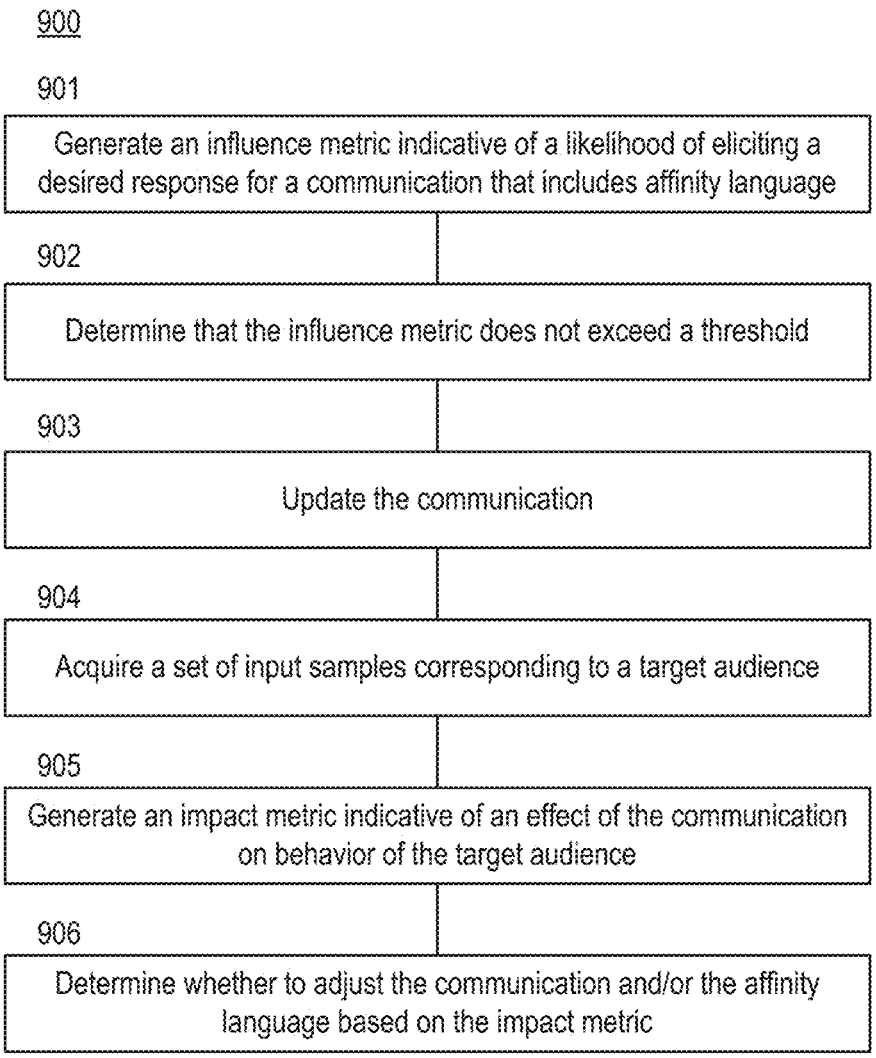
FIG. 9 is a flow diagram of a process for determining whether to alter a communication that includes affinity language to improve its effectiveness in impacting the behavior of a target audience.

FIG. 9 is a flow diagram of a process 900 for determining whether to alter a communication that includes affinity language to improve its effectiveness in impacting the behavior of a target audience. Step 901 of FIG. 9 may be substantially similar to step 806 of FIG. 8. As discussed above, the communication optimization platform may compare the influence metric to a threshold (or a series of thresholds) in order to estimate effectiveness of the communication in eliciting a desired response from a target audience. In some instances, the communication optimization platform will discover that the influence metric does not exceed the threshold (step 902). In such instances, the communication optimization platform may update the communication in an effort to improve its effectiveness (step 903). For example, the same affinity language could be incorporated into the communication in another manner, or different affinity language could be incorporated into the communication.

Thereafter, the communication optimization platform may acquire a set of input samples corresponding to the target audience (step 904). Each input sample can include written language and/or spoken language. For example, the input samples may include posts written on a social media platform by members of the target audience, recordings of survey calls to members of the target audience, etc.

The communication optimization platform can then examine the set of input samples to discover what effect, if any, the communication has had on the behavior of the target audience. For example, the communication optimization platform may generate an impact metric indicative of the actual effect that the communication had on the behavior of the target audience (step 905). Much like the influence metric, the impact metric may account for how the actual effect varies by geography, age, presentation medium, etc. Accordingly, a single communication may be associated with multiple impact metrics.

The communication optimization may determine whether to alter the communication and/or the affinity language based on the impact metric (step 906). For example, the communication optimization platform may not make any changes to the communication if the impact metric exceeds a threshold (e.g., results in a certain number of purchases of a product advertised in the communication, results in a certain number of individuals changing their view on a political theme or a social theme that is the subject of the communication). As another example, the communication optimization platform may adjust the affinity language if the impact metric does not exceed the threshold. Such adjustments may include ensuring that an existing term in the affinity language is not included in future communications, altering an existing term in the affinity language, or adding a new term to the affinity language.

Unless contrary to possibility, it is envisioned that the steps described above may be performed in various sequences/combinations. For example, results of the analysis described above with respect to steps 904-906 may be automatically applied at periodic intervals to continually adjust the affinity language over time, as appropriate. Periodic performance of these steps may also enable analysis of the resulting series of impact metrics to discover the time-varying effectiveness of the communication in influencing behavior of the target audience.

Other steps may also be included in some embodiments. For instance, several embodiments are described in the context of affinity language that is generated based on input samples produced by a source audience. However, affinity language could be generated based on the reaction of the source audience to one or more samples of communications. The sample communications could be, for example, preexisting examples of communications or dynamically generated examples of communications. Thus, the communication optimization platform may obtain (e.g., acquire and/or generate) a series of sample communications having different themes, language, and/or styles, identify a source audience from amongst a population of individuals, and cause at least one sample communication to be shown to each member of the source audience. The communication optimization platform can examine the feedback received from each member of the source audience to see which sample communications were persuasive. In particular, the communication optimization platform may receive input from each member of the source audience that indicates whether the sample communications shown to him/her were found to be persuasive. Whichever sample communications were deemed persuasive may be identified as the input samples for the source audience.

Accordingly, each member of the source audience may be separately prompted to specify which sample communications, if any, were found to be persuasive. Such an approach allows the communication optimization platform to readily discover popular layouts, affinity language, theming, etc. Because these sample communications are presented to the source audience as a way of discovering the most impactful affinity language, the input samples are not created by the source audience. Instead, the members of the source audience simply choose the input samples from amongst sample communications shown by the communication optimization platform.

Those skilled in the art will recognize that these steps may be useful in a variety of different contexts. For example, the communication optimization platform may facilitate the detection of fraud by cross-referencing results of linguistic analysis with a psychographic profile for a given individual (or group of individuals) to generate a unique fingerprint that could be used to verify identity. As another example, the communication optimization platform may isolate affinity language that repeatedly produces consistent results and then package these terms as reusable rules/filters (e.g., for a social media platform) that can be applied to input samples with predictable results. As another example, the communication optimization platform may be able to create new documents that are optimized/tuned for specific audiences. An example would be an electronic textbook that is created in a format that can be readily altered with affinity language for each student. While each student may receive an electronic textbook that includes the same content, the linguistics, style, and/or manner of presentation may be individually tailored.

Use Cases

The communication optimization platforms described herein can be configured to perform a variety of operations on input sample(s) to generate an appropriate output (e.g., a targeted written communication, such as a personalized advertisement). Examples of operations include:

Orthographic Analysis: Detecting patterns in language inputs, such as word frequency, word proximity, and word pairing. In some embodiments, inputs are segmented into elements (e.g., paragraphs, sentences, or words), and then those elements can be tagged with information (e.g., part of speech, lemma, lexical class, script, or language).

Ranking: Performing a ranking operation based on counting and analysis of an input compared to language produced by a known set. Examples of known sets include existing customers, citizens of a particular city (e.g., London or San Francisco), individuals from a particular country (e.g., the United Kingdom or the United States), individuals of a certain age (e.g., 35 years old or 35-40 years old), individuals of a certain gender, clusters, and affinity groups.

In some embodiments, the communication optimization platform includes an affinity language generator configured to generate language targeted to a known set (also referred to as a "target audience"). Affinity language can be used to produce affinities and/or influence individuals or groups within a known set. For example, affinity language may be intelligently integrated into advertisements (e.g., online advertisements and/or print advertisements) intended to target individuals included a certain known set. Thus, the affinity language used to communicate with individuals included in a first known set (e.g., existing customers) may be different than the affinity language used to communicate with individuals included in a second known set (e.g., prospective customers).

The communication optimization platform may also include a statistics module for generating statistics regarding usage (e.g., trend counts). For instance, the communication optimization platform may execute a computer program that is programmed to track and report event counts for various linguistic metrics over time, such as the frequency of the use of a specific word by members of a known set.

Responsive to performing the operation(s) on the input sample(s), the communication optimization platform can produce one or more outputs. Examples of outputs include:

Ranking Against Known Sets: An output that compares newly-analyzed input(s) to known set(s) derived from prior analysis (e.g., orthographic analysis).

Alignment: An output that measures alignment/similarity with target characteristic(s) of a known set.

Commercial Alignment: An output that measures the viability of a potential customer, fan, etc., against one or more target customers included in a known set.

Candidate Alignment: An output that measures the characteristics of a candidate individual (e.g., a potential job candidate) against one or more successful individuals (e.g., successful employees) in a known set.

Political Alignment: An output that measures the viability of a potential voter against one or more existing supporter included in a known set.

Cause Alignment: An output that measures the viability of a potential supporter of a particular cause against one or more existing supporters included in a known set.

Segmentation Analysis: An output that segments multiple inputs into clusters. Examples of clusters can include joiners (e.g., groups or individuals prone to affiliation), fighters (e.g., groups or individuals prone to conflict), individualists (e.g., groups or individuals prone to independence), bots (e.g., algorithmic language generators), leaders (e.g., groups or individuals prone to assume leadership roles), and empathizers (e.g., groups or individuals prone to empathize with others).

Statistics: Output(s) indicative of usage (e.g., of the communication optimization platform or natural language terms), reaction (e.g., to affinity language terms), etc. For example, some embodiments of the platform are configured to create visual representations of the output(s) in the form of trendlines, bubble charts, etc.

New Affinity Language: An output that includes language generated to produce a sense of affinity/influence within a group of individuals.

Additional affinity language content can be manually generated by an individual (e.g., a platform administrator or a marketing professional) or automatically generated by the communication optimization platform. For example, additional affinity language content could be generated based on (or incorporating) a New Affinity Language output produced by a computer program executed by the communication optimization platform.

Various machine learning algorithms and techniques could be employed by the platform to improve the optimization of inputs, including Naïve Bayes Classifier algorithms, K Means Clustering algorithms, Support Vector Machine algorithms, linear regression, logic regression, artificial neural networks, etc. These machine learning algorithms/techniques may be chosen based on application (e.g., supervised or unsupervised learning) and optimized based on how an individual reacts to output(s) produced by the platform (e.g., whether an output is subsequently used).

The additional affinity language content be delivered to individuals and/or group audiences in the form of batches (i.e., batch inputs) or a continuous stream (i.e., streaming inputs). The additional affinity language content is generally intended to influence the individuals/groups in some manner. For example, additional affinity language content may be intelligently integrated within targeted online advertising materials.

Affinity language can be used in a variety of different applications. Examples of applications include:

Customer Support: Language can be sampled in the context of support requests, and affinity language can be designed to improve customer communication via either written or spoken communication channels.

Education/Training: Language can be sampled in the context of class discussions and/or assignments, and affinity language can be designed to provide students optimized feedback on assignments, increase clarity/consistency in teaching materials, etc.

Marketing/Advertising: Language can be sampled in the context of online sources (e.g., forums, social media, customer support) where customers gather, and affinity language can be designed to optimize the effectiveness of marketing/advertising messaging to prospective customers.

Social/Political: Language can be sampled from online sources (e.g., forums or social media) that supporters of a particular social/political cause frequent, and affinity language can be designed to create support for a particular issue, candidate, etc.

Employment Recruiting: Language can be sampled from online sources (e.g., job boards and employer review websites) that potential job candidates frequent, and affinity language can be designed to optimize recruitment efforts.

While some features of the technology have been described in the context of input samples including text media, those skilled in the art will recognize that the platform may perform similar processes for input samples including audio media and/or video media.

As noted above, the source audience and the target audience may completely overlap, partially overlap, or be entirely unique.

An example of completely overlapping source and target audiences is a business that wishes to communicate more effectively with its customers by targeting existing customers. In such embodiments, the communication optimization platform may sample language corresponding to existing customers, and then generate affinity language tailored to the language patterns and psychographic attributes of the same existing customers. The business may use the affinity language within messages to increase effective of customer communication.

An example of partially overlapping source and target audiences is a social/political enterprise that wants to build support by recruiting new supporters. In such embodiments, the communication optimization platform may sample language corresponding to existing supporters, and then generate affinity language tailored to the language patterns and psychographic attributes of the existing supporters. However, the affinity language may be incorporated into messages intended to better target potential supporters having similar attributes as the existing supporters. Use of the affinity language may also build support among the existing supporters.

An example of completely unique source and target audiences is a business that wishes to recruit new employees that are compatible with the psychographic attributes of existing employees. In such embodiments, the communication optimization platform may sample language corresponding to the existing employees, and then generate affinity language tailored to the language patterns and psychographic attributes of the existing employees. The affinity language may be used to communicate more effectively with potential employees that are similar to the existing employees.

As shown by these examples, the communication optimization platform can be designed to help any user who wants to enhance effectiveness or communications, regardless of whether they include text media, audio media, video media, or any combination thereof.

Illustrative Examples

Several examples are provided below in which the communication optimization platform is used to improve effectiveness of communications. Such examples are provided to illustrate the usefulness of the technology in various scenarios.

In a first example, an individual is interested in increasing sales of LEGO® products to a source audience and a target audience. Initially, the communication optimization platform acquires language samples corresponding to a batch of existing LEGO® customers. Generally, the batch of existing LEGO® customers will include a subset of all existing LEGO® customers, though the batch could include all existing LEGO® customers. Here, for example, the language samples are obtained as text from "Lego User Group," an online customer community. In some embodiments the language samples are manually acquired and uploaded to the communication optimization platform, while in other embodiments the language samples are automatically acquired by the communication optimization platform. Thus, the communication optimization platform may be configured to seek out language samples autonomously online.

Linguistic analysis can then be performed on the language samples by the communication optimization platform as follows:

- Language samples are compared to reference samples, which are randomized samples of language that are not associated with the source audience (i.e., the batch of existing LEGO® customers). Though not authored by the source audience, for best results, the reference samples may be in the same language and substantially contemporaneous to the language samples. If geotagging is available, the reference samples may be from a similar geographic location as the source audience.
- Pattern recognition is used to distinguish features of the source audience as distinct from a reference audience corresponding to the reference samples. Pattern recognition may make use of Natural Language Processing techniques including, but not limited to, morphological analysis, sentence structure, meaning, and context. Patterns recognized in the language samples of the source audience may occur across the full range of features.
- When taken together, these features provide a "fingerprint" of characteristics that distinguish the language samples of the source audience from the reference samples of the reference audience. A human readable version of the fingerprint may appear as follows:
  High Emotive Expression: Score+120
  High Use of Empathetic Language: Score+86
  Less Complex Sentence Structure: Score−22
  Less Formal Language Structure: Score−47
- These scores indicate that the source audience ranks higher than the reference audience on emotive expression and emphatic language and lower than the reference audience on sentence complexity and language formality.
- Scoring can then be used by the communication optimization platform to map attributes (also referred to as "linguistic features") of the language samples to psychographic attributes, such as extraversion, emotional stability, agreeableness, conscientiousness, openness, etc.
- By mapping the linguistic features to the psychographic attributes, the communication optimization platform can produce a psychographic affinity profile. The psychographic affinity profile may include a series of metrics that are indicative of similarity to various baseline profiles. For example, the psychographic affinity profile may appear as follows:

| | |
|---|---|
| Empathetic | 9/10 |
| Individualist | 3/10 |
| Collaborator | 8/10 |
| Joiner | 8/10 |
| Fighter | 1/10 |
| Leader | 3/10 |

- Here, the psychographic affinity profile has identified the source audience (i.e., the batch of existing LEGO® customers) as being empathetic, collaborative, and willing to join groups (i.e., relative to the reference audience).
- Once the communication optimization platform has completed linguistic and psychographic profiling, it can proceed to generate affinity language intended to optimize the effectiveness of communications to the target audience. Results of psychological studies on the identification of personality markers via use of language (e.g., similar to those mentioned above) may be used to create an initial training set for machine generation of affinity language by the communication optimization platform.
- Rules for generating affinity language may be refined within the communication optimization platform via a continuous machine-learning feedback loop including affinity language generation, publication (e.g., including A/B testing), measurement of influence within the target audience, language adjustment, republication, remeasurement, and so on.
- The target audience may be composed of both existing and potential LEGO® customers, and the goal may be to create communications that improve effectiveness of communications in increasing sales of LEGO® products to the target audience. The affinity language may be published as is, or it may be integrated into other communications to be presented to the target audience.
- Here, for example, marketing communications intended for the target audience can contain affinity language integrated with a "call to action" (e.g., to buy a product) and product sales can be measured as a marker of effectiveness of the marketing communications. In cases where the target audience is prompted to buy the product online, near real-time measurement of effectiveness of published marketing communications can be achieved (e.g., by using online product orders as a proxy for effectiveness).

In some embodiments, the communication optimization platform is designed to operate as a network-accessible service (also referred to as a "cloud service"). In such embodiments, a variety of features can function on a continuous basis. Examples of such features include automated seeking/harvesting of language samples, linguistic and psychographic analysis, affinity language generation and optimized regeneration, influence measurement, A/B testing of affinity language, etc. Moreover, after initial configuration, the communication optimization platform can function autonomously for an indefinite period of time to continuously enhance audience-based communication.

In a second example, an individual ("Alice") is interested in increasing customer satisfaction as measured by ratings given by customers of a company that manufactures music speakers in the context of customer service. Alice may use the communication optimization platform to continuously sample language used in online customer forums where existing customers discuss their experiences with the company and its products. The language samples are analyzed, and affinity language is generated that is used in product documentation, customer support materials, responses to customer support requests, etc. The affinity language can improve the clarity and effectiveness of customer-facing communications, and customer service satisfaction ratings may rise accordingly.

In a third example, an individual ("Juan") wants to improve the results of students at an online university at which he is a professor. Because interactions occur online, Juan cannot meet with these students in person. He can correspond with them online, however, and also join online forums where students can post questions, discuss assignments, etc. The online university may use the communication optimization platform to gather and sample student language from these forums and generate affinity language that is that may be used in assignments, student feedback, etc. The communication optimization platform can also be configured to sample language from an individual student and generate affinity language tailored specifically for that student. Juan finds that using the communication optimization platform helps him communicate more effective with his students, which improves their educational outcomes.

In a fourth example, an individual ("Clarice") is tasked with creating marketing messages to support sales of a popular sports beverage. Her company has done market research showing that customers of a major athletic shoe brand are likely candidates to consume sports beverages as well. Clarice can use the communication optimization platform to sample language from online product reviews written by customers of the athletic shoe brand. The communication optimization platform then uses those samples to create affinity language that Clarice can incorporate into sports drink marketing materials directed to the athletic shoe customer base. She finds that the communication optimization platform makes her marketing communications more effective and sales trended higher following distribution of marketing communications that include the affinity language.

In a fifth example, an individual ("Leo") is interested in improving child nutrition. Leo works in the policy group of a non-governmental organization (NGO), and he focuses on creating and publishing position papers and editorials that advocate various policies to improve the state of childhood nutrition. Leo follows the work of several leading NGOs that have a track record of effectiveness in advocating for related causes to similar audiences. Leo uses the communication optimization platform to sample language from the existing public communications of these peer-group NGOs and generate new affinity language for his NGO. The affinity language is then incorporated into his NGO's publications, thereby leading to increased support for its causes.

In a sixth example, an individual ("Sophie") manages the human resources department of a global airline. Sophie's definition of success is sourcing the best possible talent across multiple job functions in a competitive global market for specialized airline personnel. To compete effectively against larger rivals, she uses the communication optimization platform to sample language from existing successful employees of her airline, and then segregate these employees into groups based on job function (e.g., technical, flight operation, administration) and the geographies where her airline operates. The communication optimization platform then enables Sophie to generate highly targeted affinity language likely to resonate with, for example, aircraft technician candidates in Portugal, airport gate supervisor candidates in New Zealand, etc. The targeted affinity language is incorporated into job descriptions and output recruiting materials, thereby resulting in increased success in recruiting and hiring the best possible candidates.

Processing Systems

Figure 10:
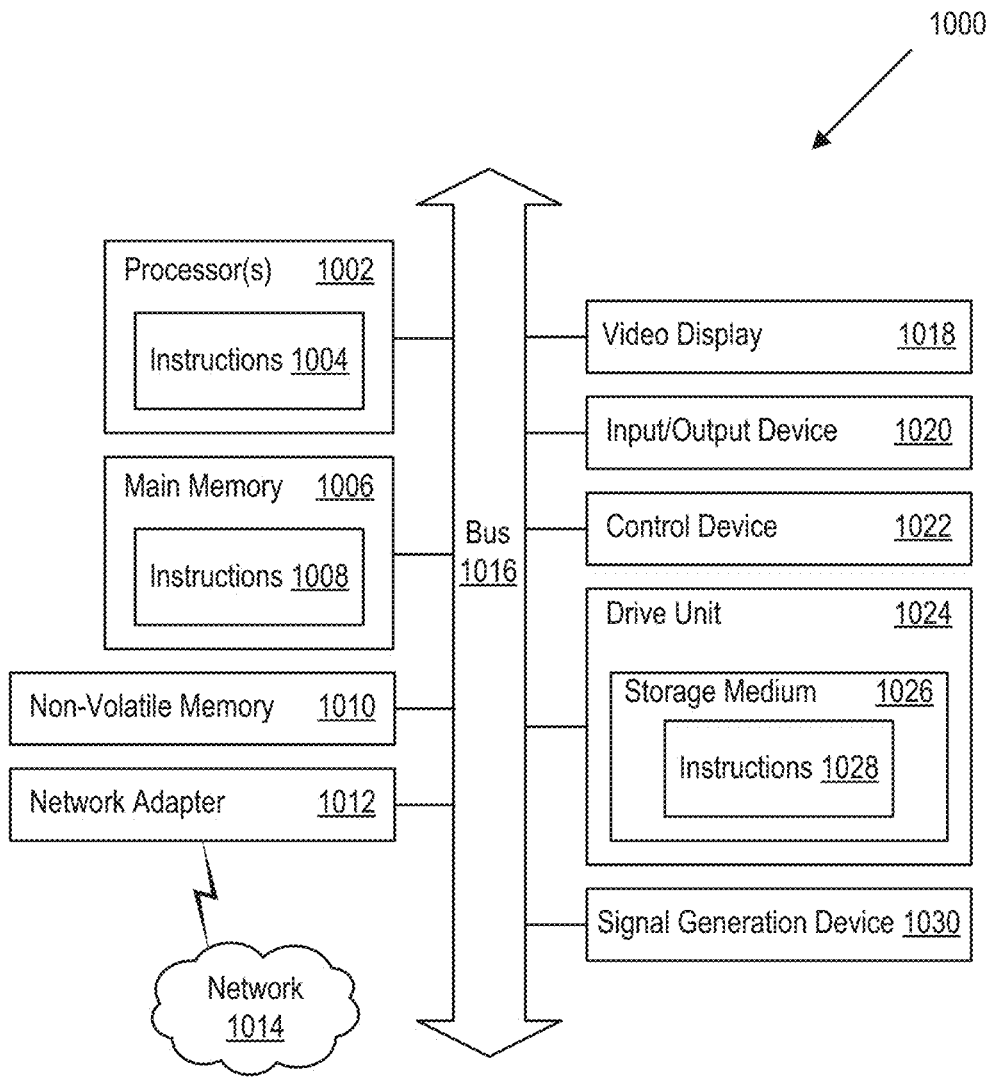
FIG. 10 is a block diagram illustrating an example of a processing system in which at least some operations described herein can be implemented.

FIG. 10 is a block diagram illustrating an example of a processing system 1000 in which at least some operations described herein can be implemented. For example, some components of the processing system 1000 may be hosted on a computing device that includes a communication optimization platform.

The processing system 1000 may include one or more central processing units ("processors") 1002, main memory 1006, non-volatile memory 1010, network adapter 1012 (e.g., network interface), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1000 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computing device. When read and executed by the one or more processors 1002, the instruction(s) cause the processing system 1000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    acquiring a first set of input samples that are generated by a source audience that is representative of a first collection of individuals who share a characteristic in common;
    identifying multiple linguistic features by identifying a separate linguistic feature for each input sample of the first set of input samples;
    producing a linguistic model based on the multiple linguistic features identified for the first set of input samples;
    generating, based on the linguistic model, affinity language for communicating with a target audience that is representative of a second collection of individuals who share the characteristic in common;
    causing at least some of the affinity language to be incorporated into a first communication to be made accessible to the target audience via a media channel;
    determining an influencing effect of the first communication on the target audience by—
        collecting a second set of input samples that are generated by the target audience, and
        measuring the influencing effect by comparing the second set of input samples against the first set input samples; and
    incorporating the affinity language into a second communication in response to a determination that the influencing effect falls beneath a threshold.

2. The computer-implemented method of claim 1, further comprising:
    producing a psychographic model based on the multiple linguistic features identified for the first set of input samples.

3. The computer-implemented method of claim 1, wherein each input sample of the first set of input samples includes audio media, and wherein said identifying comprises:
    performing a language processing operation on the first set of input samples to identify words spoken in each input sample.

4. The computer-implemented method of claim 1, wherein each input sample of the first set of input samples includes video media, and wherein said identifying comprises:
    performing
        a character recognition operation on the first set of input samples to identify words written in each input sample, a language processing operation on the first set of input samples to identify words spoken in each input sample, or any combination thereof.

5. The computer-implemented method of claim 1, wherein said causing comprises:

incorporating the at least some of the affinity language into the communication; and publishing the communication on the media channel, thereby causing the communication to be presented to the target audience.

6. The computer-implemented method of claim 1, further comprising:

acquiring multiple reference samples from at least one reference source;

labeling each reference sample of the multiple reference samples with at least one attribute; and creating a training set from the labeled reference samples;

wherein said generating is based on a comparison of the linguistic model to the training set.

7. The computer-implemented method of claim 6, wherein each attribute of the at least one attribute is a linguistic attribute or a psychographic attribute.

8. The computer-implemented method of claim 2, wherein the affinity language is further generated with the psychographic model.

9. A non-transitory computer-readable medium with instructions stored thereon that, when executed by a processor, cause the processor to perform operations comprising:

acquiring a first set of input samples that are generated by members of a source audience;

identifying a linguistic feature by performing a language processing operation on the first set of input samples;

producing a linguistic model for the source audience based on the linguistic feature;

generating, based on the linguistic model, affinity language for communicating with a target audience;

incorporating at least some of the affinity language into a communication to be presented to the target audience;

causing the communication to be presented to the target audience;

generating an impact metric that is indicative of a likelihood of the communication eliciting a desired response from the target audience by— acquiring a second set of input samples that are generated by members of the target audience, and producing the impact metric based on an analysis of the second set of input samples; and determining whether adjustment of the communication or the affinity language is necessary based on the impact metric.

10. The non-transitory computer-readable medium of claim 9, wherein the operations further comprise:

producing a psychographic model for the source audience based on the linguistic feature.

11. The non-transitory computer-readable medium of claim 10, wherein the affinity language is generated based on the linguistic model and the psychographic model.

12. The non-transitory computer-readable medium of claim 9, wherein the operations further comprise:

identifying the target audience to which the communication is to be presented, wherein the target audience shares a characteristic in common with the source audience.

13. The non-transitory computer-readable medium of claim 12, wherein the characteristic is an interest in a product, wherein each member of the source audience is a past purchaser of the product, and wherein each member of the target audience is a potential purchaser of the product.

14. The non-transitory computer-readable medium of claim 9, wherein the communication is an advertisement for a product, and wherein the desired response is a purchase of the product.

15. The non-transitory computer-readable medium of claim 9, wherein the target audience and the source audience share at least one member in common.

* * * * *